United States Patent [19]
Giamati et al.

[11] Patent Number: 5,475,204
[45] Date of Patent: Dec. 12, 1995

[54] ELECTRICAL HEATER DE-ICER

[75] Inventors: Michael J. Giamati; Kevin Leffel, both of Akron; Tommy M. Wilson, Stow, all of Ohio

[73] Assignee: The B. F. Goodrich Company, Akron, Ohio

[21] Appl. No.: 63,367

[22] Filed: May 17, 1993

Related U.S. Application Data

[63] Continuation of Ser. No. 531,588, Jun. 1, 1990, abandoned.

[51] Int. Cl.$^6$ .............................. H05B 3/20; B64D 15/00; B64D 15/12
[52] U.S. Cl. .................. 219/548; 244/134 R; 244/134 D
[58] Field of Search ..................................... 219/548, 549, 219/550, 528, 529; 338/210, 212, 283, 293, 314; 191/62; 244/134 R, 134 A, 134 D

[56] References Cited

U.S. PATENT DOCUMENTS

| | | | |
|---|---|---|---|
| 2,745,942 | 5/1956 | Cohen | 219/549 |
| 2,762,897 | 9/1956 | Vrooman | 219/549 |
| 2,992,317 | 7/1961 | Hoffman | 219/549 |
| 3,022,412 | 2/1962 | Waters | 219/549 |
| 3,204,084 | 8/1965 | Spencer | 219/549 |
| 3,336,557 | 8/1967 | Lund et al. | 338/210 |
| 4,286,143 | 8/1981 | Tadewald | 219/443 |
| 4,788,417 | 11/1988 | Graflind | 219/528 |
| 4,861,649 | 8/1989 | Browne | 428/240 |

*Primary Examiner*—Leo P. Picard
*Assistant Examiner*—Michael D. Switzer
*Attorney, Agent, or Firm*—Kevin L. Leffel; Wayne D. Porter

[57] ABSTRACT

A de-icer for a structural member of an aircraft is provided. The de-icer includes first and second heaters having first and second electrically conductive strips, respectively. The first and second conductive strips are configured to form first and second marginal portions, respectively. The first and second heaters are positioned relative to each other such that the marginal portions are overlapped.

34 Claims, 5 Drawing Sheets

ELECTRICAL HEATER DE-ICER

This application is a continuation of application Ser. No. 07/531,588, filed Jun. 1, 1990, now abandoned.

BACKGROUND OF THE INVENTION

1. Field of the Invention

The present invention relates to an improved electrical de-icer for heating an ice accumulation surface of an aircraft to control ice accumulation on a structural member, and more particularly to a de-icer facilitating heat flow between adjoining elements.

2. Description of the Prior Art.

The accumulation of ice on aircraft wings and other structural members in flight is a danger that is well known. As used herein, the term "structural members" is intended to refer to any aircraft surface susceptible to icing during flight, including wings, stabilizers, engine inlets, rotors, and so forth. Attempts have been made since the earliest days of flight to overcome the problem of ice accumulation. While a variety of techniques have been proposed for removing ice from aircraft during flight, these techniques have had various drawbacks that have stimulated continued research activities.

One approach that has been used is so-called thermal deicing. In thermal de-icing, the leading edges, that is, the portions of the aircraft that meet and break the airstream impinging on the aircraft, are heated to prevent the formation of ice or to loosen accumulated ice. The loosened ice is blown from the structural members by the airstream passing over the aircraft.

In one form of thermal de-icing, heating is accomplished by placing an electrothermal pad(s), including heating elements, over the leading edges of the aircraft, or by incorporating the heating elements into the structural members of the aircraft. Electrical energy for each heating element is derived from a generating source driven by one or more of the aircraft engines. The electrical energy is intermittently or continuously supplied to provide heat sufficient to prevent the formation of ice or to loosen accumulating ice.

With some commonly employed thermal de-icers, the heating elements are configured as ribbons, i.e. interconnected conductive segments, that are mounted on a flexible backing. The conductive segments are separated from each other by gaps, i.e. intersegmental gaps, and each ribbon is electrically energized by a pair of contact strips. When applied to a wing or other airfoil surface, the segments are arranged in strips or zones extending spanwise or chordwise of the aircraft wing or airfoil. One of these strips, known as a spanwise parting strip, is disposed along a spanwise axis which commonly coincides with a stagnation line that develops during flight in which icing is encountered. Other strips, known as chordwise parting strips, are disposed at the ends of the spanwise parting strip and are aligned along chordwise axes. Other zones, known as spanwise shedding zones, typically are positioned above and below the spanwise parting strip at a location intermediate the chordwise parting strips. Between adjacent zones, a gap, known as an interheater gap, exists.

In one preferred form of de-icing, an electrical current is transmitted continuously through the parting strips so that the parting strips are heated continuously to a temperature above 32° F. In the spanwise shedding zones, on the other hand, current is transmitted intermittently so that the spanwise shedding zones are heated intermittently to a temperature above about 32° F. While this technique of heating the various zones generally is effective to melt ice (or prevent its formation) without the consumption of excessive current, a problem exists in that melting of ice in the inter-segmental and interheater gaps can be difficult or impossible. Moreover melting of ice on or around the contact strips can also be difficult or impossible. Accumulation of ice in the gaps and on the contact strips is particularly undesirable since the unmelted ice serves as "anchors" for ice that would be melted but for the ice accumulated in the gaps or on the contact strips.

Desirably, a thermal de-icer would be available that would provide effective de-icing action while employing an efficient design that minimizes the formation of cold spots.

SUMMARY OF THE INVENTION

In response to the foregoing concerns, the present invention provides a new and improved thermal de-icer for aircraft structural members. The de-icer according to the invention includes a first heater and a second heater, which first and second heaters respectively include a first electrically conductive strip and a second electrically conductive strip. The first and second conductive strips are configured to form a first marginal portion and second marginal portion, respectively. The first and second heaters are positioned relative to each other such that the marginal portions are overlapped.

In one preferred embodiment of the invention, the de-icer is attached to an outer surface of the structural member. Each of the first and second strips communicate with a current source by way of electrical contacts. The contacts have portions that are remotely disposed of the first and second strips, and the contacts are heated by a portion of either the first heater or the second heater. Additionally, an insulating layer is used in conjunction with the heaters to facilitate uniform distribution of heat throughout the de-icer. Finally, the strips are configured to maximize the efficiency of current flow therein, and hence improve their ability to generate heat. In the preferred form of operation, current is transmitted through the first strip and the second strip by way of the contacts so that enough heat is generated in the marginal portions to eliminate cold spots that typically form in the marginal portions.

In the preferred embodiment, a spanwise parting strip is disposed along an axis which typically defines the stagnation line developed under icing conditions. Chordwise parting strips are disposed at the ends of the spanwise parting strip and are aligned along chordwise axes. The spanwise parting strip and a plurality of spanwise shedding zones are arranged in a spanwise shedding area.

In one preferred embodiment, the spanwise parting strip and each of the spanwise shedding zones can be individually controlled, so that the location of the spanwise parting strip can be shifted in accordance with flight conditions and, more specifically, with any shift in the stagnation line. While the spanwise and chordwise parting strips typically are heated continuously to maintain an ice free condition, groups of spanwise shedding zones in the shedding area(s) are heated sequentially to melt or loosen accumulated ice. Even though chordwise parting strips typically are used to minimize ice bridging between the shedding areas, bridging can be alleviated or possibly eliminated by overlapping the time interval of heating each zone with that of the next adjacent zone.

Numerous advantages of the present invention will be appreciated by those skilled in the art.

One advantage of the present invention is that it minimizes colds spots developed during de-icing as a result of the existence of interheater gaps. By overlapping elements, heat is effectively and efficiently generated in the interheater gaps. This is in contrast to the typical thermal de-icer which is incapable of effectively generating heat in the inter-heater gaps.

Another advantage of the present invention is that it optimizes element dimensions, such as conductive segment length, conductive segment width and inter-segmental gap width. Optimization of element dimensions promotes efficient heating and minimizes the amount of overlapping that is required to gain desired heat distribution in the de-icer.

Yet another advantage of the present invention is that it eliminates cold spots which can arise on and around contacts. That is, in the present invention, each contact is overlapped preferably with a heater to prevent icing of the contact means. Alternatively, the contacts are segregated from ice accumulating surfaces by, for example, folding the contacts under the heaters. Hence the heater design serves to eliminate substantially all of the ice accumulation which typically occurs on and around the contacts.

Yet another advantage of the present invention is that it improves heat transfer capability of the thermal de-icer. More specifically, through use of an insulating layer heat is more evenly distributed throughout the de-icer. At the same time, use of insulating layer enhances the de-icer's ability to transfer heat to the interheater gaps.

Another advantage of the present invention is that it affords highly desirable levels of heating while using a minimum amount of power. More specifically, by sequentially heating spanwise shedding areas, power consumption is minimized without sacrificing de-icing capabilities. Additionally, flexible control of the elements maximizes de-icing capability. In particular, as flight conditions change, the interval during which each element is heated can be varied.

The foregoing and other features and advantages of the present invention will become more apparent when viewed in light of the description of the best embodiment of the invention and the drawings that follow, which together form a part of the specification.

DETAILED DESCRIPTION OF THE PREFERRED EMBODIMENT

Figures 1, 8:
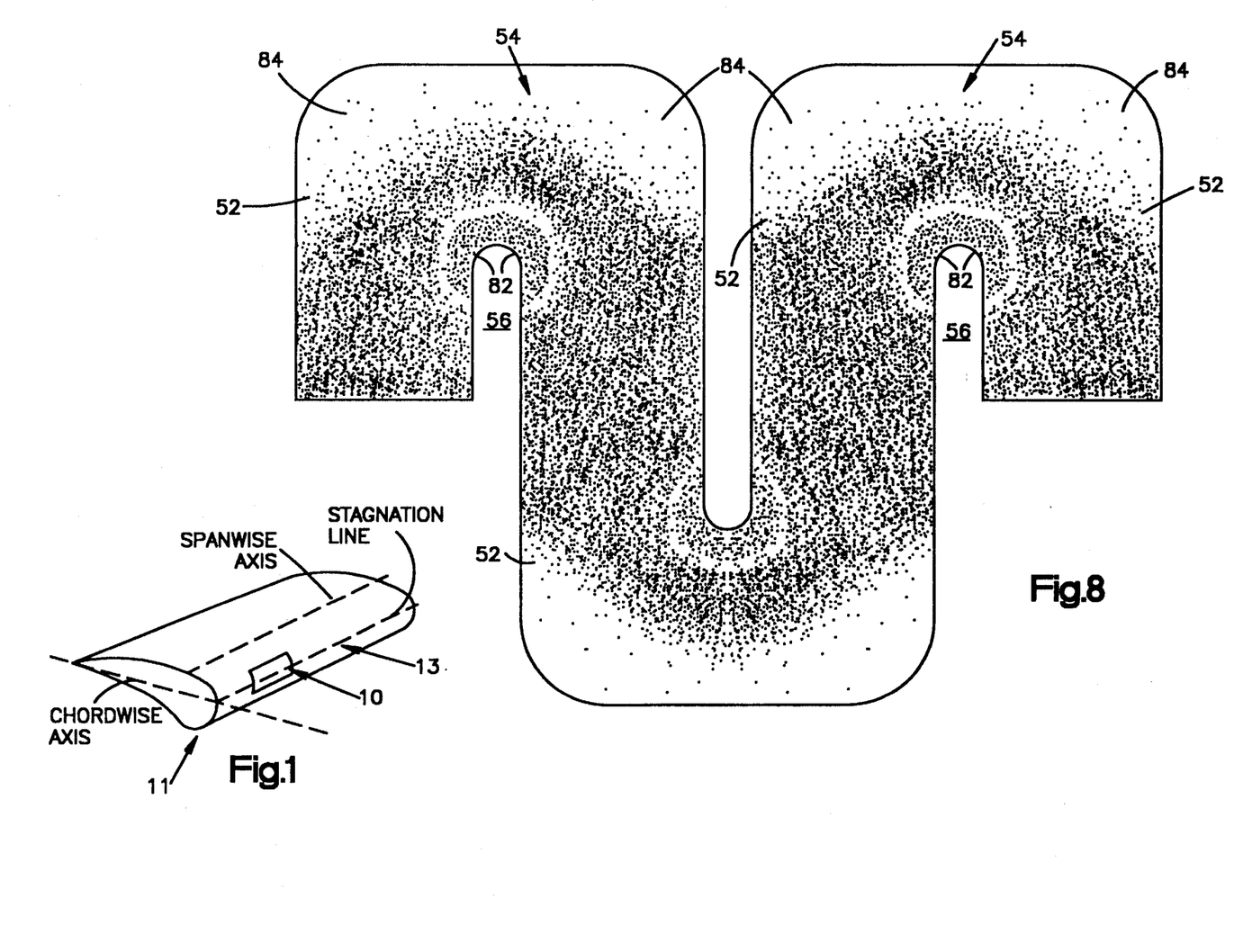
FIG. 1 is a partial perspective view of an airfoil having a thermal de-icer mounted along the airfoil's leading edge.
FIG. 8 is a computer generated representation of current flux patterns in a ribbon segment of a thermal de-icer.

The present invention is directed toward thermal de-icers used on structural members of an aircraft. Referring to FIG. 1, a thermal de-icer 10 according to the prior art is shown mounted on a structural member 11 in the form of a wing. As is known, the structural member 11 includes a chordwise axis and a spanwise axis. During flight, airflow impinges a leading edge 13 of the structural member 11, and a number of stagnation points develop,, forming a stagnation line or axis, which stagnation line varies during flight conditions.

The de-icer 10 is mounted symmetrically about the stagnation line which would be most commonly encountered during icing conditions. Due to the sweep of the structural member 11 upon which the de-icer 10 is employed, a pair of chordwise disposed or side edges of the de-icer 10 have a chevron shape when the de-icer 10 is flat. As will be appreciated by those skilled in the art, configuring the side edges in this manner allows for two of de-icers 10 to be placed side-by-side, along the leading edge 13, without forming a gap between the two de-icers 10. For a structural member 11 with no sweep, the side edges would be perpendicular with the stagnation line when the de-icer 10 is flat. In the following discussion, the operation of a single de-icer 10 will be discussed. It should be recognized, nonetheless, that commonly a number of de-icers 10 would be mounted adjacent to one another along the leading edge 13 of the structural member 11.

Figure 2:
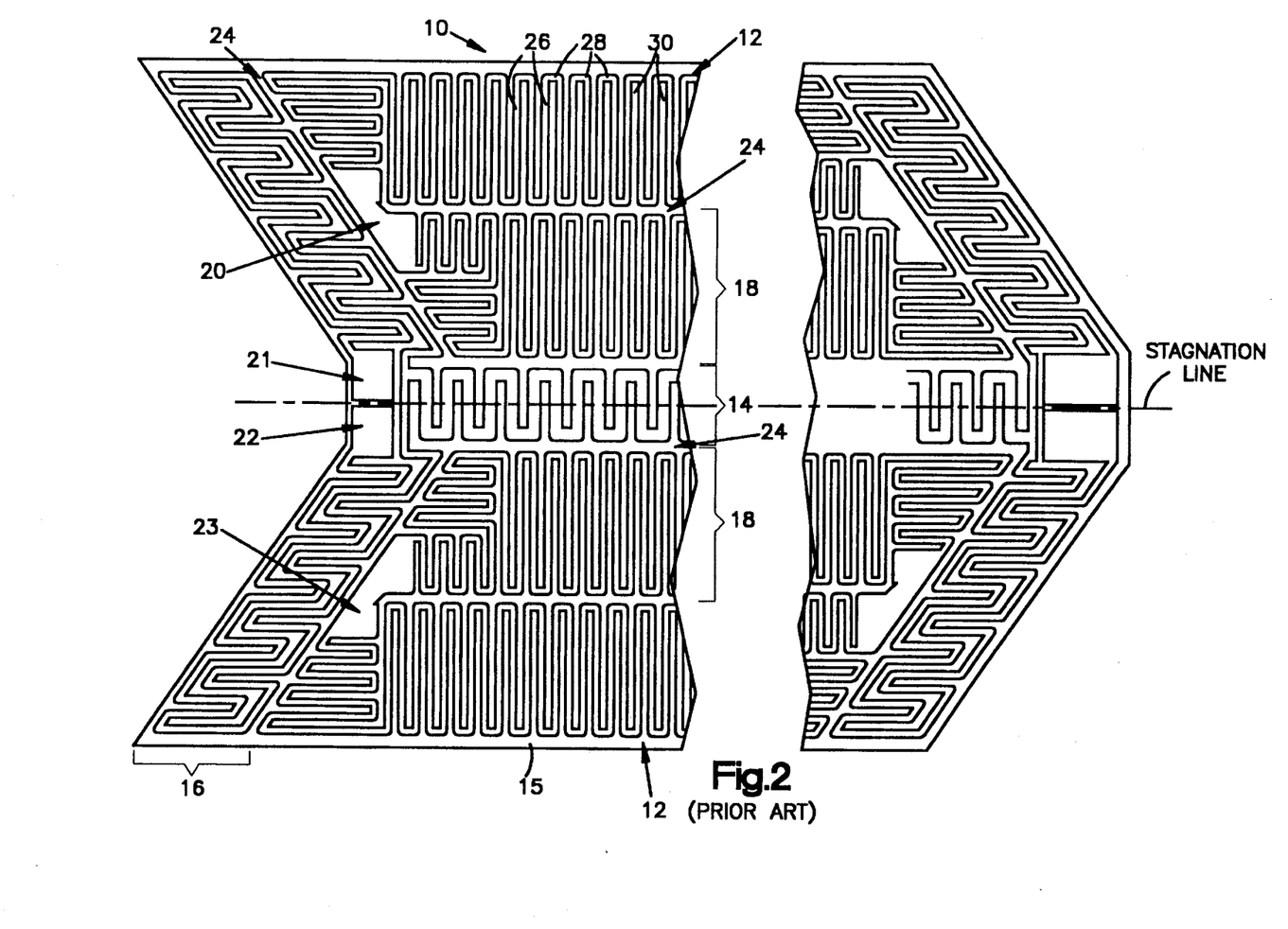
FIG. 2 is a top plan view of a prior art thermal de-icer.

FIG. 2 illustrates in further detail the prior art thermal de-icer 10 which includes a plurality of elements or ribbons 12. The elements 12 typically are mounted on a flexible backing 15 and are arranged to provide a spanwise parting strip 14, chordwise parting strips 16, and spanwise shedding zones 18. Current is transmitted to the elements 12 by way of contacts 20–23. As illustrated in FIG. 2, contacts 20–23 include four pairs of contact pads, four of which pads are disposed on one end of the de-icer 16 and the other four of which are disposed on an opposing end of the de-icer 10. In operation, voltage differences are established between the pad pairs so that current flows through each of the elements 12.

Interheater gaps 24 are disposed between the various zones 14, 16 and 18. The elements 12 are defined by interconnected conductive segments 26, which conductive segments 26 are aligned along axes that are parallel with either the stagnation line or chordwise axes of the structural member 11. Each pair of conductive segments 26 is interconnected by a turn 28 and defines an inter-segmental gap 30.

In operation, current is transmitted continuously to the spanwise and chordwise parting strips 14, 16 so that heat is generated continuously therein. Heat is generated continuously in the spanwise parting strip 14 since ice that accumulates adjacent to the stagnation line, such as rime ice, tends to be most difficult to melt. Current is transmitted intermittently to the spanwise shedding zones 18 so that heat is generated intermittently therein. One object of the de-icer 10 is to melt all of the ice that accumulates adjacent to the elements 12, but in practice certain problems arise.

First, with heating or de-icing systems such as de-icer 10, ice can accumulate in the interheater gaps 24 as well as in the inter-segmental gaps 30. More specifically, during operation, very little current flows in the outer portions or corners of the turns 28 so that even when, for example, the turns 28 of one of the elements 12 are positioned close to the turns 28 of another of the elements 12, there still is no practical way to transfer heat from the one set of turns 28 to the other set of turns Second, in common prior art arrangements of de-icer 10, no heat is supplied to contacts 20–23. In particular, the contact pads of contacts 20–23 are much wider than typical conductive segments 26 and are attached to a heavy leadwire having a relatively large cross-sectional area. Thus, the contact pads dissipate relatively little energy and are cold spots, upon which ice accumulates. Moreover, the contact pads serve as "anchors" for ice which would have melted but for the cold spots generated by the contacts 20–23.

Third, the interheater gaps 24 between the chordwise parting strips 16 and the spanwise shedding zones 18 are particularly difficult to heat. More specifically, referring to FIG. 2, the outside corners of the turns 28 disposed near the chordwise parting strip 16 are angled to accommodate for the chevron-shaped edges of the de-icer 10. In operation, current does not flow efficiently in these angled corners and the resulting cold spot(s) can make the task of sufficiently heating the interheater gaps 24 even more difficult.

Finally, some of the conductive segments 26 are too short in length to provide adequate heating. It has been found that when the conductive segments 26 are too short, current flux density is such that an undesirable heating pattern is achieved in the element 12.

It is believed that the de-icer 10, while certainly more efficient than many known thermal de-icers, is incapable of minimizing cold spots. That is, even if cold spots could be eliminated in the interheater gaps 24 by generating more heat in the elements 12, the de-icer 10 still would consume undesirably high levels of power. Moreover, generation of more heat would not necessarily allow for melting in the region of the contacts 20–23 or in certain of the turns 28 formed near the chordwise parting strips 16. Therefore, there is a need for a heater that economically and efficiently provides heat to the interheater gaps 24 and the inter-segmental gaps 30 as well as to the contacts 20–23.

Figure 3:
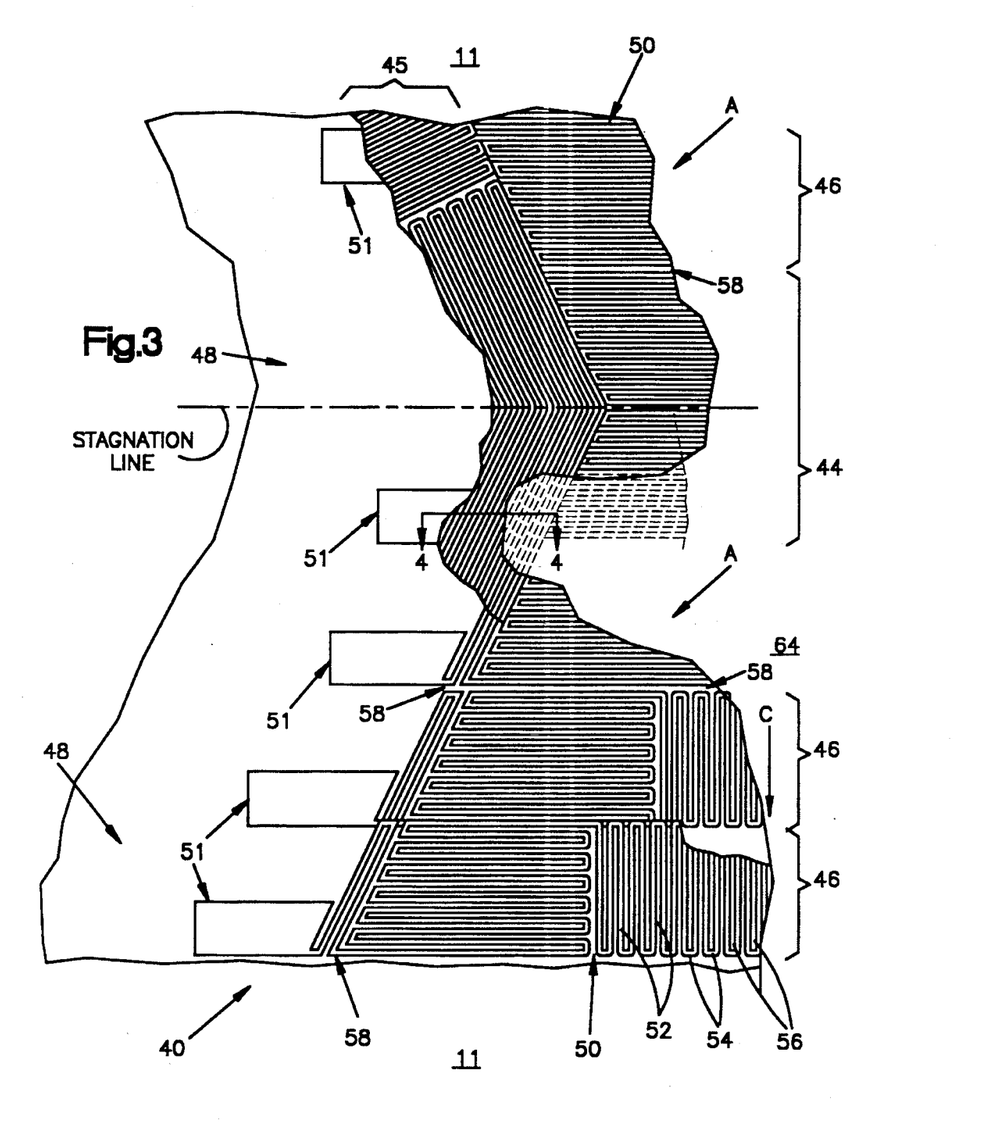
FIG. 3 is a partial, broken-away top plan view of a thermal de-icer according to the invention mounted on a structural member.

Referring to FIG. 3, a partial plan view of a thermal de-icer according to the invention is indicated by the numeral 40. It will be recognized that the de-icers 10 and 40 have some similar features. Indeed, both of the de-icers 10 and 40 are shaped similarly and are mounted on the structural member 11 in the same manner. The following discussion should make it clear, however, that the present invention includes many features that are not contemplated by the prior art.

Figure 4:
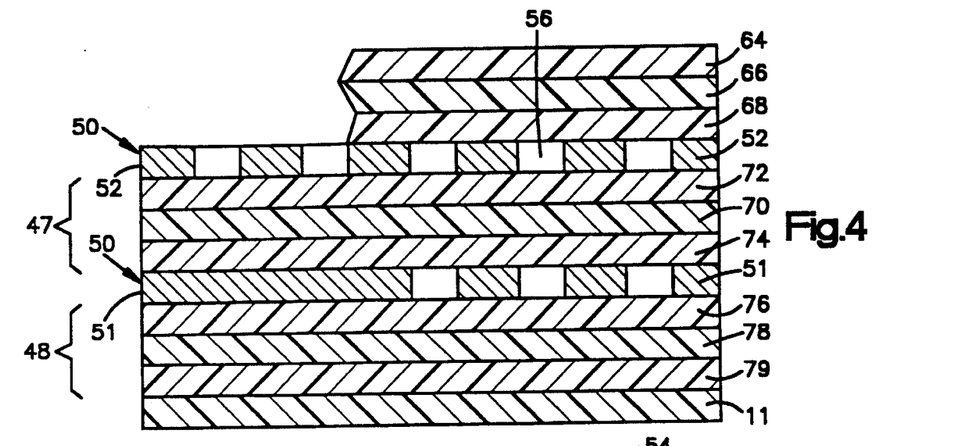
FIG. 4 is a vertical cross-sectional view of the thermal de-icer taken along plane 4—4 of FIG. 3.
Figure 9:
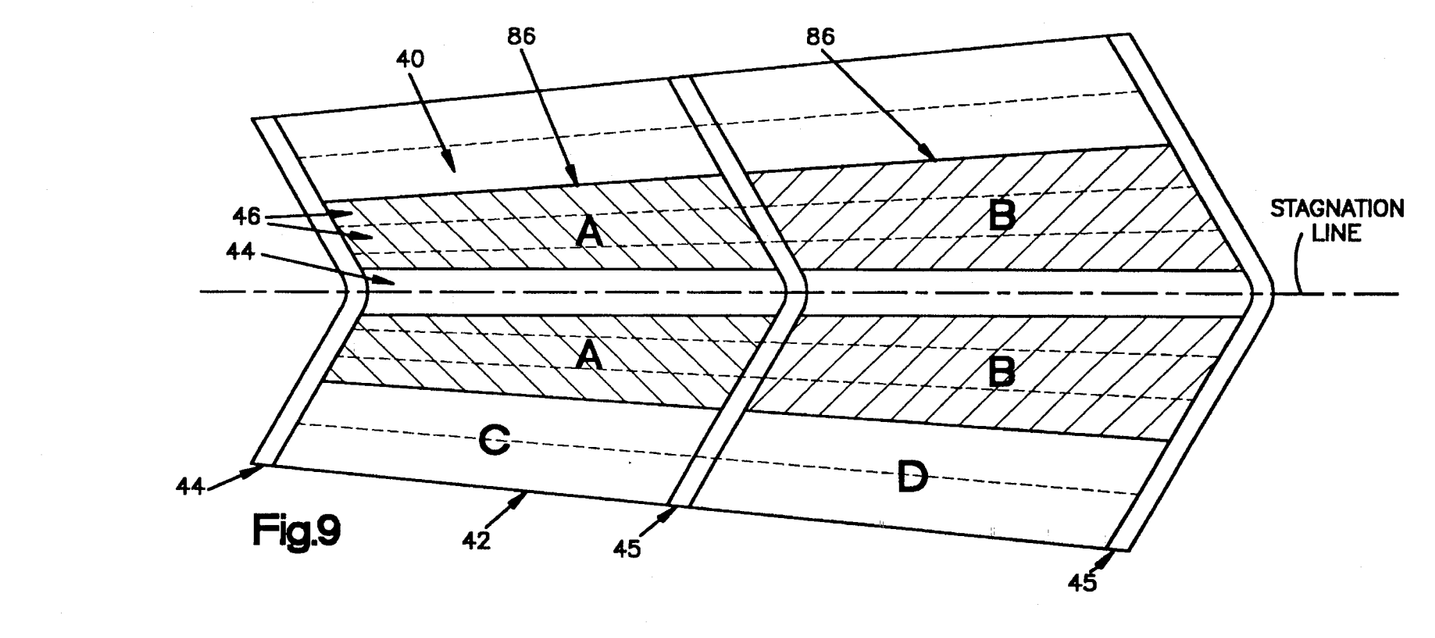
FIG. 9 is a partial, perspective view of the thermal de-icer of FIG. 3 mounted on a surface of an unfolded airfoil.

The de-icer 40 is mounted along the leading edge 13 of the structural member 11. The structural member 11, in the present example, is a composite material, but, in other examples, could be a metal, such as aluminum. Referring to FIGS. 3, 4 and 9, the de-icer 40 includes a spanwise parting strip 44 disposed over an area of the structural member, a chordwise parting strip 45 disposed over another area of the structural member and spanwise shedding zones 46 disposed over other areas of the structural member, each of which is mounted on either a flexible backing 47 or a flexible backing 48. The spanwise parting strip 44 preferably is mounted along an axis which is coincidental with a stagnation line most commonly encountered during icing conditions. The strips 44, 45 and the zones 46 include laterally spaced conductive elements or ribbons 50 which are positioned along either a spanwise or a chordwise axis. The elements 50 preferably are configured in serpentine patterns.

Current is transmitted to the elements 50 by way of contacts 51, which contacts 51 are connected to the elements 50. In the preferred embodiment, contacts 51 include pairs of contact strips or pads, each of which strip is connected to an end of element 50 and includes a substantial portion disposed remotely of strips 44, 45 and zones 46. Only one contact strip is shown for each of the elements 50 in FIG. 3, but it can be appreciated that each element 50 has two ends and each end has a contact strip attached thereto. While operation of the de-icer 40 will be discussed in further detail below, it can be recognized that heat is electrothermally generated by each element 50 when current is transmitted therethrough by establishing a voltage differential between its corresponding pair of contact strips. The heating of element 50 inhibits ice accumulation on the structural member 11 during flight.

Each of the elements 50 (FIGS. 3 and 6) includes a plurality of straight-sided conductive segments or members 52 having a uniform width. The sides of most of the conductive segments 52 are perpendicular to either a spanwise axis or a chordwise axis.

Figure 6:
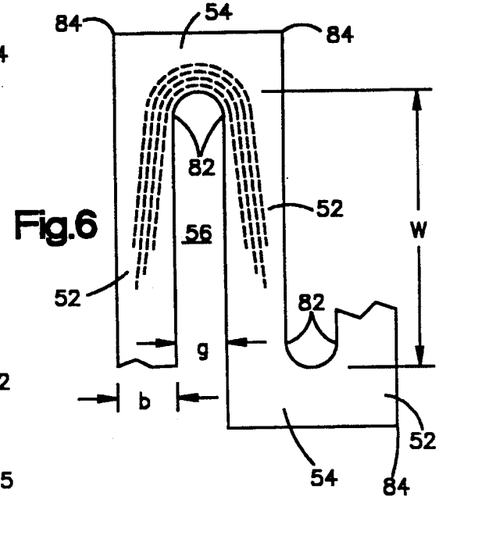
FIG. 6 is a partial, top plan view of a de-icer heating element of the present invention with rounded inside corners.

Generally, each conductive segment 52 is flanked by parallel conductive segments 52, but some of the conductive segments 52 are perpendicular to adjacent conductive segments 52. Perpendicular positioning of a conductive segment 52 relative to an adjacent conductive segment 52 permits the conductive segments 52 to be shifted from a vertical orientation to a horizontal orientation, or vice versa. Each pair of parallel conductive segments 52 is interconnected by a turn portion 54 and includes an inter-segmental gap 56.

The elements 50 are separated from one another by interheater gaps 58. In the preferred arrangement of FIG. 3, a number of interheater gaps 58 have been eliminated by superimposing an edge or marginal portion of chordwise parting strip 45 adjacent with edge or marginal portions of the spanwise parting strip 44 and the spanwise shedding zones 46. Thus, adjacent elements 50 disposed over adjacent areas partially overlap along marginal portions of each element such that the marginal portion of each element extends into the adjacent area. As shown in FIG. 3, a marginal portion of that element where they are overlapped by an adjacent element 50. Moreover, referring to a lower section of the de-icer 10 in FIG. 3, one of the interheater gaps 58 between spanwise shedding zones 46 has been eliminated by overlapping turns 54 of one of elements 50 with the turns 54 of another of adjacent elements 50. The significance of overlapping the elements 50 will be discussed in further detail below. It can be appreciated at this moment, however, that such overlap eliminates cold spots which can exist in interheater gaps 58 during the heating of elements 50, and facilitates more desirable heat distribution between elements 50.

As mentioned above, cold spots, which can function as ice anchors, commonly form in the area covered by the contacts 51. In the preferred embodiment of FIG. 3, the local cold spots attributable to the contacts 51 are eliminated by overlapping the contacts 51 with the chordwise parting strip 45. Under one alternative technique for eliminating cold spots attributable to the contacts 51, the contacts 51 are folded under the elements 50 subsequent to mounting and etching of the elements 50 and contacts 51 on either of backings 47, 48. Under another alternative for eliminating cold spots, the contacts 51 are overlapped by a spanwise parting strip 44 or a spanwise shedding zone 46.

When the de-icer 40 is attached to an upper surface of structural member 11, leadwires are coupled to contacts 51 from the underside of de-icer 40. During installation leadwires are extended from the electrical system of the aircraft and through the leading edge 13 to the contact means 51. It also can be appreciated that chordwise parting strips 45 have contacts (not shown) which in one embodiment can be disposed under portions of the one or more spanwise parting strips 44.

In FIG. 4, the de-icer 40 is attached to an outer surface of the structural member 11. In other embodiments, however, the de-icer 40 could be attached to an inner surface of the structural member 11. The de-icer 40 of FIG. 4 has an erosion-resistant layer 64 which serves as the surface upon which ice accumulates. While in the preferred embodiment erosion-resistant layer 64 is a stainless steel erosion shield having a thickness of about 0.005 inch, in other embodiments the erosion-resistant layer 64 could be constructed of a thin layer of thermoplastic film, polyurethane paint, elastomeric material, titanium, aluminum, nickel or other durable materials.

Referring still to FIG. 4, the element 50 of the chordwise parting strip 45 is spaced from the erosion resistant layer 64 by layers 66 and 68 of epoxy film adhesive. The element 50 of the chordwise parting strip 45 is separated from the element 50 of the spanwise shedding zone 44 by a layer 70 of cured epoxy/fiberglass which is sandwiched between layers 72 and 74 of epoxy film adhesive. In one embodiment, the epoxy film adhesive layers 66, 68, 72 and 74 are rated at 0.03 pounds per square foot. The element 50 of spanwise shedding zone 46 and the adjacent contacts 51 are supported by epoxy layer 76. The layer 76 is prepregnated with fiberglass. In the preferred embodiment, the layers 70 and 76 serve to provide backing and support for elements 50 and contacts 51. In one example, elements 50 and contacts 51 are made of copper-aluminum alloy as well as mounted and etched on either backing 47 or 48. The etched copper-aluminum strips may range in thickness from 0.001 inch to 0.010 inch. Additionally the backing 47, formed of layers 70, 72 and 74, has a thickness ranging from about 0.002 inch to 0.010 inch.

When the de-icer 10 is mounted on the outer surface of the structural member 11, as in FIG. 4, both the chordwise parting strip 45 and the spanwise shedding zone 46 preferably are underlain by insulating layer 78 to facilitate heat distribution in two dimensions. The insulating layer 78 is preferably spaced from structural member 11 by a backing 79 of fiberglass prepregnated with epoxy. In the preferred embodiment, the insulating layer 78 is a resinous matrix which is impregnated with hollow glass spheres. A product which serves as insulating layer 78 in the preferred embodiment is manufactured by Hysol, and is sold under the trademark SYNCORE. In the present example, the insulating layer 78 is about 0.04 inch thick.

It has been found that use of the insulating layer 78 serves to enhance the heat transfer characteristics between the strips 44–45 and the zones 46, and, more particularly, promotes distribution of heat throughout the de-icer 40. Referring again to FIG. 4, it will be recognized by those skilled in the art that the elements are capable of directing heat toward the structural member 11. If insulating means 78 were not used, an undesirable amount of generated heat could be transferred to the structural member 11. When insulating layer 78 is employed, heat directed toward the insulating layer 78 is distributed throughout the de-icer 40 rather than being undesirably transferred to the structural member 11.

Figure 5:
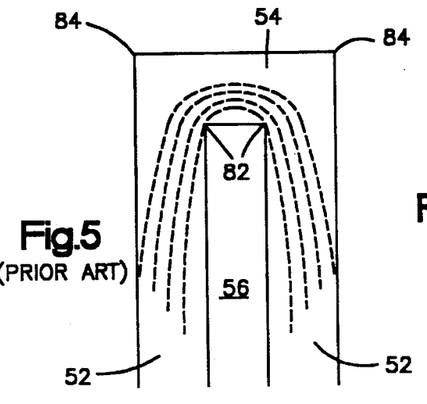
FIG. 5 is a partial, top plan view of a prior art de-icer heating element with sharp inside corners.
Figure 7:
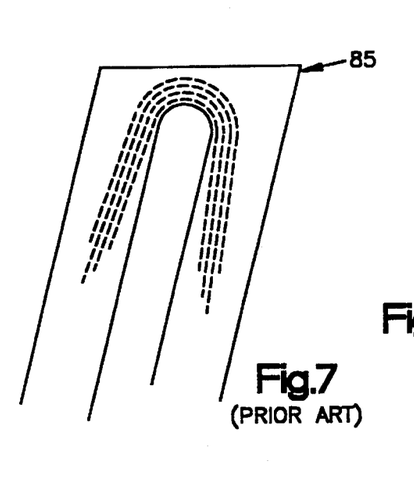
FIG. 7 is a partial, top plan view of a prior art angled de-icing heating element.

Referring now to FIGS. 4–8, the configuration of each element 50 is explained in further detail. In the preferred embodiment, each turn 54 (FIG. 6) includes a pair of inside corners 82 and a pair of outside corners 84. To determine the heat distribution electrothermally generated in conductive segments 52 and turns 54 as a result of current flux pattern in the element 50, computer-generated analyses were performed. It will be appreciated by those skilled in the art that current flux lines, which are indicated in FIGS. 5–7 by the numeral 83, serve to depict the distribution of current flow across a cross-sectional area that is transverse to either a conductive segment 52 or a turn 54. Heat generation varies directly as a function of the spacing of the flux lines 83 to one another. That is, as the spacing between adjacent current flux lines 83 is reduced heat generation increases, and vice versa.

In one computer-generated analysis, it was found that when inside corners 82 are relatively sharp (FIG. 5), the current flux lines 83 around inside corners 82 are squeezed so that hot spots and cold spots are developed along the inside portion of turn 54. In comparison, when the inside corners 82 are rounded or curved as in FIG. 6, the flux lines are more evenly spaced so that heat is more uniformly distributed about the inside portion of the turn 54. Many prior art embodiments use sharp inside corners within element turns, as in FIG. 5, apparently failing to recognize the advantageous current flow that can be achieved by using rounded inside corners.

Referring to FIG. 7, an angled element 85 used in prior art arrangements is shown. In swept airfoils, elements, such as element 85, have been constructed to follow airflow streamlines. Using such an angled configuration makes the element relatively easy to draw and tends to readily conform it with the airfoil shape. An angled outside corner such as that shown in FIG. 7, however, promotes uneven heat distribution in outside corners.

Referring to FIG. 8, a computer generated analysis of the current flux pattern around corners 82, 84 is shown. As indicated by the graphic analysis, in which current flux is represented by the stippled portion, current flux decreases dramatically toward outside corners 84. Hence, while cold spots cannot be eliminated in the outside corners 84 of turns 54, the cold spots at least can be reduced by using sharp or square outside corners 84, as in FIG. 6. Employing perpendicular element segments with square outside corners 84, such as the ones in FIG. 6, allows for efficient arrangement of the elements 50 and results in a heat pattern with smaller cold spots in the outside corners 84. In contrast to the rounded outside corners of elements 12 (FIG. 2), the corners 84 define more conductive area to which heat can be transferred. In contrast to element 85 of FIG. 7, the corners 84 are more symmetrical, and thus promote more even heat distribution therein.

Proper dimensioning of the elements 50 improves current flux density, and thereby improves performance of the de-icer 40. Computer-generated analysis has indicated that, in a preferred example, the width of the segment 52, i.e. b (FIG. 6), and the inter-segmental gap, i.e. g, preferably are less than 0.05 inch and 0.045 inch, respectively. Moreover, for each conductive segment 52, current flux lines 83 are more evenly distributed when the distance between the inside corner 82 of a turn 54 and the next adjacent inside corner 82 of the next adjacent turn 54, i.e. w, is at least five times greater than b. Thus, heat is generated more uniformly in each conductive segment 52 having a w:b of at least 5:1.

As can be recognized now, the dimensions of the elements 12 in FIG. 2 are inadequate since the ratio between w and b is not maintained at a value of at least five throughout. In contrast, all of the elements 50 of FIG. 3 maintain at least a five to one ratio between w and b.

Referring to FIG. 9, the operation of de-icer 40 is explained in further detail. In the example of FIG. 9, the de-icer 40 is disposed on a six-foot section of the structural member 11, and includes two spanwise shedding areas 86, each of which includes one of the spanwise parting strips 44 and a plurality of spanwise shedding zones 46. Six groups of spanwise shedding zones 46 are shown in FIG. 2, and for convenience of discussion, the grouped spanwise shedding zones 46 will be indicated by capital letters, namely A–D. Additionally, in the preferred embodiment each of the spanwise parting strips 44, as well as each of the spanwise shedding zones 46, can be controlled individually.

In a preferred form of operation, current is transmitted continuously to the spanwise parting strip 44, which typically is positioned near the stagnation line, and the chordwise parting strips 45. Accordingly, heat is generated continuously in the parting strips 44,45. Heat is generated continuously in the spanwise parting strip 44 since it is difficult to de-ice areas adjacent to the stagnation line, where rime ice commonly accumulates. The temperature of the parting strips 44,45 preferably is maintained above freezing, i.e. 32° F. To be conservative, the temperature of the strips 44–45 preferably is maintained at about 50° F. or greater. As indicated in the timing chart of FIG. 10, zones A-D are heated sequentially to melt accumulated ice. Use of sequential heating decreases the amount of power consumed by the de-icer 40.

Figure 10:
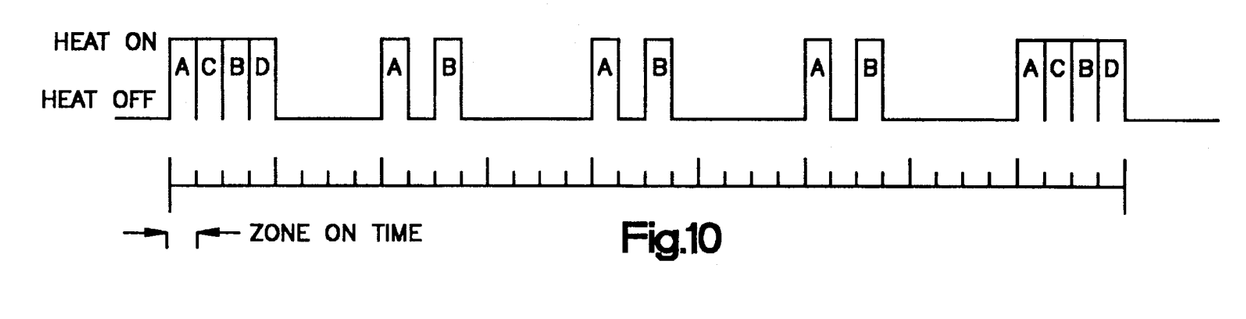
FIG. 10 is a timing diagram depicting a heating sequence used with the de-icer of FIG. 9.

Typically, ice removal near the aft zones of the structural member 11 is less critical to lift than ice removal on forward zones of the structural member 11. Consequently, as illustrated in FIG. 10, it may be desirable to apply heat more frequently to spanwise groups A and B than to spanwise groups C and D. For the example of FIGS. 9 and 10, current pulses are applied to spanwise groups A and B during each power cycle. The power cycles are defined by eight increments, each of which may be 4–12 seconds. The duration of each time interval is determined by, among other features, ambient temperatures to which the spanwise groups A–D are subjected, the efficiency of the de-icer 40 and the shape of the structural member 42.

In the example of FIG. 9, since the contacts 51 and the end portions of the spanwise shedding zones 46 are overlapped by continously heated chordwise parting zones 45 (FIGS. 3 and 4), ice can accumulate only in spanwise groups A–D. Additionally, use of continuously heated chordwise parting zones 45 insures that ice bridging cannot occur between the spanwise shedding areas 86. That is, even when spanwise group A begins to re-ice during the time interval in which it receives no current, ice bridging from spanwise group A to spanwise group B is avoided since ice cannot transcend the heated chordwise parting zone 45 separating the groups A and B. This bridging problem also could be solved by overlapping the time intervals during which the spanwise groups A and B are heated. This alternative solution might not always be desirable, however, since it inevitably increases power consumption. It can be recognized that such alternative solution would be particularly applicable in those arrangements in which the chordwise parting strips 45 are not used.

In the example of FIG. 10, to fully melt the ice between the junctions of spanwise groups A and C as well as B and D (FIGS. 9 and 10), heat was applied to spanwise groups C and D for two heating cycles. It is probable that if elements 50 near the junctions of spanwise groups A and C (FIG. 3) as well as the junctions between spanwise groups B and D were overlapped only one heating cycle would have been required to afford effective deicing. Moreover, any ice bridging between groups A and C as well as groups B and D could be minimized by overlapping the time intervals during which groups A and C as well as groups B and D are heated.

Figure 11:
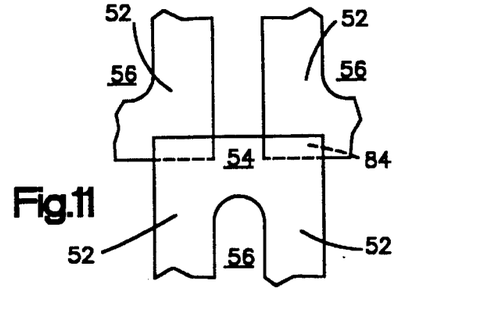
FIG. 11 is a partial, top plan view of one de-icer heating element superimposed with two other de-icer heating elements.

As can be fully appreciated now, many of the interheater gaps 58 can be eliminated by overlapping the elements 50. Moreover the extent of overlap need not be significant to accomplish desirable heat distribution patterns throughout each of the overlapped groups A–D. That is, simply by overlapping outer corners 84 of two elements 50, cold spots are substantially eliminated. When the outside corners 84 of two elements 50 are superimposed (FIG. 11), the heat transfer to each of elements 50 is improved considerably. For example, assuming that each outside corner 84 is heated at 2 BTU/ft²/hr, upon superimposing the outside corners 84, the amount of heat flow in the vicinity of the superimposed corners 84 approximately is doubled to about 4 BTU/ft²hr.

As long as the outside corners 84 are overlapped, as described above, an important objective is achieved, i.e. to improve the heating capability of de-icer 10. It has been found, nonetheless, that when the elements 50 are offset so that the outside corners 84 are superposed and the turn portions of one element overlap an inter-segmental gap of another element, as in FIG. 11, an optimum heating pattern is achieved between the overlapped elements 50. By offsetting the elements 50, the possibility of developing hot spots, particularly toward the middle sections of turns 54, is minimized.

As mentioned above, the spanwise parting strip 44 and each of the spanwise shedding zones 46 can be controlled individually. It has been found that this characteristic can be used to provide added flexibility in de-icing. More particularly, the spanwise parting strip 44 usually is positioned to coincide with the stagnation line that exists under typical flight conditions; however, the stagnation line will shift according to angle of attack of the aircraft. Any extensive change in the angle of attack can shift the stagnation line into the vicinity of the spanwise shedding zones 46.

By controlling heating of the spanwise parting strips 44 and the various spanwise shedding zones 46, the location of the spanwise parting strip 44 can be shifted. That is, one of the spanwise shedding zones 46 can be heated continuously and designated as the spanwise parting strip 44. Similarly, the original spanwise parting strip 44 and the remaining spanwise shedding zones 46 can be heated intermittently and designated as spanwise shedding zones 46. The shifted arrangement is maintained until the stagnation line returns to its normal position. When the stagnation line returns to its normal position, continuous heating of the original spanwise parting strip 44 is resumed and intermittent heating of the temporary spanwise parting strip 44 is resumed.

In the preferred embodiment, the chordwise conductive segments 52 have a length of about one inch. Since the spanwise parting strip 44 and the spanwise shedding zones 46 can be controlled individually, the location of the spanwise parting strip 44 (FIG. 9) can be shifted, in increments of one inch, above or below the commonly encountered stagnation line.

During normal flight conditions the angle of attack commonly varies. The position of the stagnation line shifts up or down as the angle of attack varies. As mentioned above, the spanwise parting strip 44 desirably is positioned about the stagnation line. It can therefore be appreciated that the ability to shift the spanwise parting strip 44 up or down in response to shifts in the stagnation line is an advantageous aspect of the de-icer 40.

In one example of operation, the spanwise shedding zones 48 are powered intermittently at 20W/in$^2$ while the parting zones are powered continuously at 8W/in$^2$–30 W/in$^2$. These watt densities will vary in response to a host of environmental and structural factors, such as wind and temperature conditions to which the structural member 11 is subjected as well as the temperature at which the parting strips 44,45 and the spanwise shedding zones 46 are maintained.

In the foregoing description, it will be readily appreciated by those skilled in the art that modifications may be made to the invention without departing from the concepts disclosed herein. Such modifications are to be considered as included in the following claims unless those claims, by their language, expressly state otherwise.

What is claimed is:

1. An electrothermal de-icer for inhibiting accumulation of ice on an aircraft structural member, comprising:

an electrically conductive first element configured in a serpentine-like pattern and disposed over a first area of the structural member in which accumulation of ice is inhibited during flight by electrothermally heating the first element;

an electrically conductive second element configured in a serpentine-like pattern and disposed over a second area of the structural member in which accumulation of ice is inhibited during flight by electrothermally heating the second element, said second area being adjacent said first area; and, wherein the first element and the second element partially overlap along marginal portions of each element such that the marginal portion of the first element extends into the second area and the marginal portion of the second element extends into the first area, and said heating of said first and second elements is independently controlled.

2. The de-icer of claim 1, wherein the first and second elements are attached to an outer surface of the structural member.

3. The de-icer of claim 1, wherein the first and second elements are attached to the structural member by means of a flexible backing made of a material including fiberglass.

4. The de-icer of claim 3, wherein the backing has a thickness within the range of about 0.002 inch to 0.010 inch.

5. The de-icer of claim 1, further comprising an insulating layer for promoting distribution of heat throughout the de-icer, the insulating layer being disposed over the structural member beneath the first and second elements.

6. The de-icer of claim 1, wherein the first element and the second element are in the form of ribbons having a first end and a second end, the first end and the second end each including an enlarged area that defines an electrical contact.

7. The de-icer of claim 6, wherein each of the electrical contacts is covered by the first element or the second element.

8. The de-icer of claim 38, wherein the structural member has a spanwise axis, and wherein the first element is aligned parallel to the spanwise axis and second element is aligned parallel to the chordwise axis.

9. The de-icer of claim 38, wherein the structural member has a spanwise axis, and the first and second elements are aligned parallel to the spanwise axis.

10. The de-icer of claim 1, wherein the first element comprises a metal ribbon etched on a flexible backing.

11. The de-icer of claim 2, further comprising a weather-resistant layer covering the first and second elements.

12. The de-icer of claim 11, wherein the weather resistant layer includes a stainless steel erosion shield, and wherein the first and second elements are disposed intermediate the stainless steel erosion shield and the outer surface of the structural member.

13. The de-icer of claim 3, wherein the first element and the second element are made from a copper-aluminum alloy.

14. The de-icer of claim 13, wherein the copper-aluminum alloy is etched on the flexible backing.

15. The de-icer of claim 5, wherein the insulating layer comprises a resinous matrix in which hollow glass spheres are impregnated.

16. The de-icer of claim 15, wherein the resinous matrix has a thickness of about 0.04 inch.

17. The de-icer of claim 1, wherein the first element comprises a first strip including a multitude of elongate first members, each of the first members being spaced from adjacent first members by a first inter-segmental gap, and a multitude of first turn portions interconnecting the first members to form a serpentine ribbon with a plurality of the first turn portions lying in the marginal portion of the first element where they are overlapped with the second element, each first turn portion having a pair of first outside corners spaced from a pair of first inside corners; and, wherein electrothermal heating of the first turn portions proximate the first outside corners is less than electrothermal heating proximate the first inside corners due to current flux being non-uniform in the first turn portions.

18. The de-icer of claim 17, wherein the first members are less than about 0.06 inch wide, the first inter-segmental gaps are less than about 0.05 inch wide, a portion of each first member bounded by two of the turn portions has a length that is at least five times greater than a width of that member, each first turn portion has a pair of rounded inside corners and a pair of sharp outside corners and the included angle of each outside corner is approximately 90°.

19. The de-icer of claim 18, further comprising an insulating layer for promoting distribution of heat throughout the de-icer, the insulating layer being disposed over the structural member beneath the first and second elements.

20. The de-icer of claim 19, wherein the insulating layer comprises a resinous matrix in which hollow glass spheres are impregnated.

21. The de-icer of claim 20, wherein the resinous matrix has a thickness of about 0.04 inch.

22. The de-icer of claim 17, wherein the second element comprises a second strip including a multitude of elongate second members, each of the second members being spaced from adjacent second members by a second inter-segmental gap, and a multitude of second turn portions interconnecting the second members to form a serpentine ribbon with a plurality of the second turn portions lying in the marginal portion of the second element where they are overlapped with the first element, each second turn portion having a pair of second outside corners spaced from a pair of second inside corners; and, wherein electrothermal heating in the second turn portions proximate the second outside corners is less than electrothermal heating proximate the second inside corners due to current flux being non-uniform in the second turn portions.

23. The de-icer of claim 22, wherein the first and second members are less than about 0.06 inch wide, the first and second inter-segmental gaps are less than about 0.05 inch wide, a portion of each first and second member bounded by two of the turn portions has a length that is at least five times greater than a width of that member, each first and second turn portion has a pair of rounded inside corners and a pair of sharp outside corners and the included angle of each outside corner is approximately 90°.

24. The de-icer of claim 23, further comprising an insulating layer for promoting distribution of heat throughout the de-icer, the insulating layer being disposed over the structural member beneath the first and second elements.

25. The de-icer of claim 24, wherein the insulating layer comprises a resinous matrix in which hollow glass spheres are impregnated.

26. The de-icer of claim 25, wherein the resinous matrix has a thickness of about 0.04 inch 27. The de-icer of claim 22, wherein the first turn portions are offset relative to the second turn portions such that a first turn portion overlaps a second inter-segmental gap between two second turn portions with the first outside corners superposed over the second outside corners.

28. The de-icer of claim 1, wherein the first element comprises a multitude of elongate first members disposed generally perpendicular to a first common axis, each of the first members being spaced from adjacent first members by a first inter-segmental gap, and a multitude of first turn portions interconnecting the first members to form a serpentine ribbon; and,
wherein the second element comprises a multitude of elongate second members disposed generally perpendicular to a second common axis, each of the second members being spaced from adjacent second members by a second inter-segmental gap, and a multitude of second turn portions interconnecting the second members to form a serpentine ribbon.

29. The de-icer of claim 28, further comprising an insulating layer for promoting distribution of heat throughout the de-icer disposed over the structural member beneath the first and second elements.

30. The de-icer of claim 29, wherein the insulating layer comprises a resinous matrix in which hollow glass spheres are impregnated.

31. The de-icer of claim 30, wherein the resinous matrix has a thickness of about 0.04 inch.

32. The de-icer of claim 28, wherein the first and second common axes are parallel to each other, and a first member and a second member overlap along the marginal portions of each element.

33. The de-icer of claim 28, wherein the first and second common axes are parallel to each other, and a plurality of first turn portions and a plurality of second turn portions overlap along the marginal portions of each element.

34. The de-icer of claim 28, wherein the first and second common axes are perpendicular to each other, and a second member and a plurality of first turn portions overlap along the marginal portions of each element.

* * * * *